(12) United States Patent
Monti

(10) Patent No.: US 12,251,833 B2
(45) Date of Patent: Mar. 18, 2025

(54) CABLE-DRIVEN ROBOT

(71) Applicant: MARCHESINI GROUP S.p.A., Pianoro (IT)

(72) Inventor: Giuseppe Monti, Pianoro (IT)

(73) Assignee: Marchesini Group S.P.A. (IT)

(*) Notice: Subject to any disclaimer, the term of this patent is extended or adjusted under 35 U.S.C. 154(b) by 175 days.

(21) Appl. No.: 17/800,094

(22) PCT Filed: Mar. 5, 2021

(86) PCT No.: PCT/IB2021/051862
§ 371 (c)(1),
(2) Date: Aug. 16, 2022

(87) PCT Pub. No.: WO2021/176413
PCT Pub. Date: Sep. 10, 2021

(65) Prior Publication Data
US 2023/0100567 A1    Mar. 30, 2023

(30) Foreign Application Priority Data

Mar. 6, 2020 (IT) .......................... 102020000004765

(51) Int. Cl.
*B25J 9/00*    (2006.01)
*B25J 9/10*    (2006.01)

(52) U.S. Cl.
CPC ............. *B25J 9/104* (2013.01); *B25J 9/0078* (2013.01)

(58) Field of Classification Search
CPC ................................ B25J 9/0078; B25J 9/104
See application file for complete search history.

(56) References Cited

U.S. PATENT DOCUMENTS

| 3,564,533 A | * | 2/1971 | Linn ...................... G06K 11/00 |
| | | | 33/1 M |
| 4,918,817 A | * | 4/1990 | Eaton ..................... G01B 5/004 |
| | | | 346/139 B |
| 5,313,854 A | | 5/1994 | Akeel |
| 10,471,590 B1 | | 11/2019 | Vachon |

FOREIGN PATENT DOCUMENTS

| DE | 102019122762 A1 | 2/2020 |
| JP | H1177577 A | 3/1999 |
| WO | WO 2015170361 A1 | 11/2015 |

* cited by examiner

*Primary Examiner* — William C Joyce
(74) *Attorney, Agent, or Firm* — Endurance Law Group PLC

(57) ABSTRACT

A cable-driven robot exhibits a base structure, a movable operating element, and a plurality of cables each having a first end fixed to the movable operating element. The robot includes a plurality of movement units for the cables, at least one having a frame hinged to the base structure pivotingly about a vertical hinge axis and further having a motor mounted on the frame and comprising a rotation shaft. The one movement unit further includes at least one pulley mounted rotatably on the frame so as to be connected to the motor rotation shaft. The pulley has a fixing point in which a second end of one of the cables is fixed and has a groove conformed and dimensioned so as to accommodate and receive, internally thereof, only a winding portion of the cable comprising a series of winding turns that are concentric and overlapping one another.

10 Claims, 6 Drawing Sheets

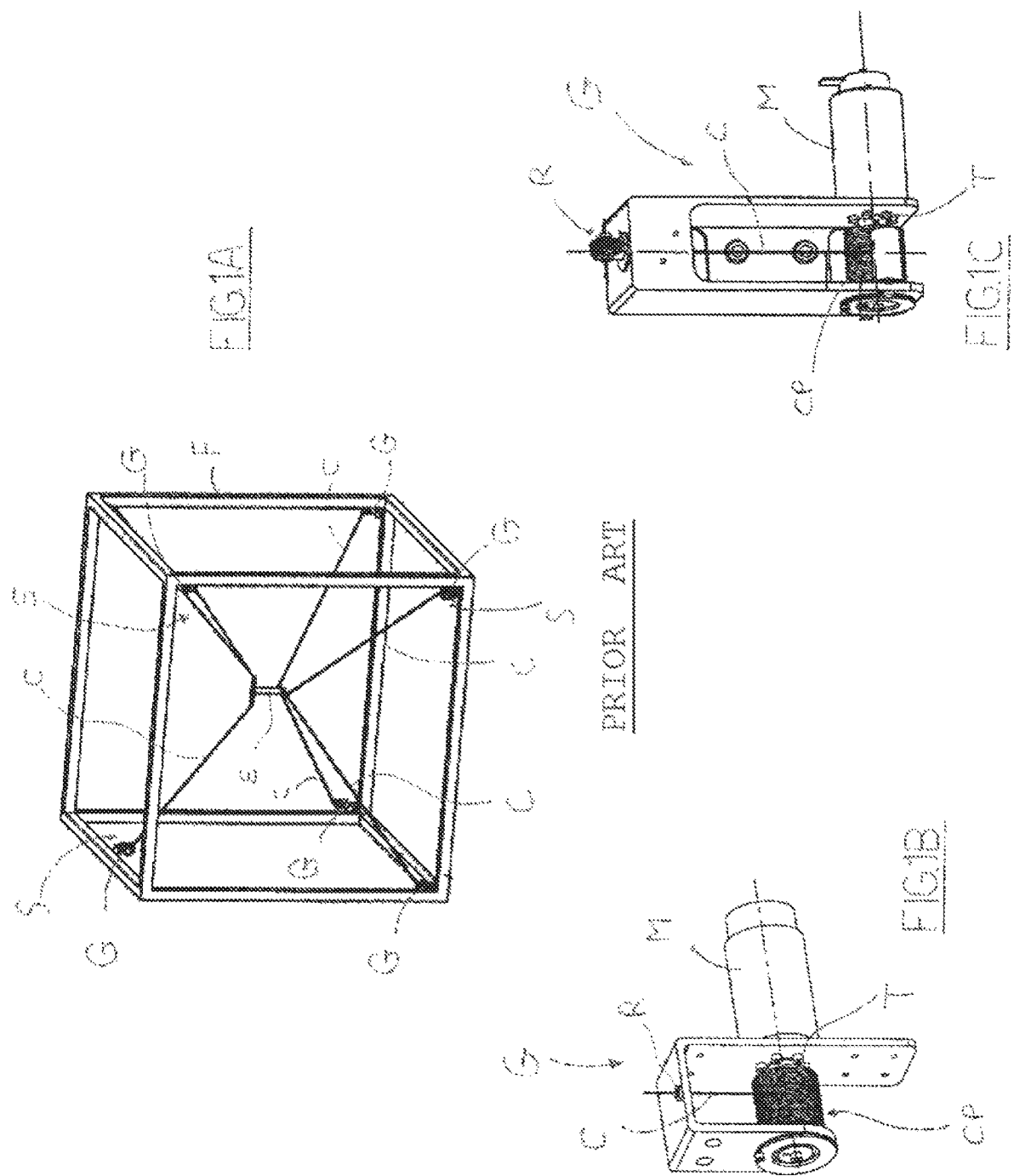

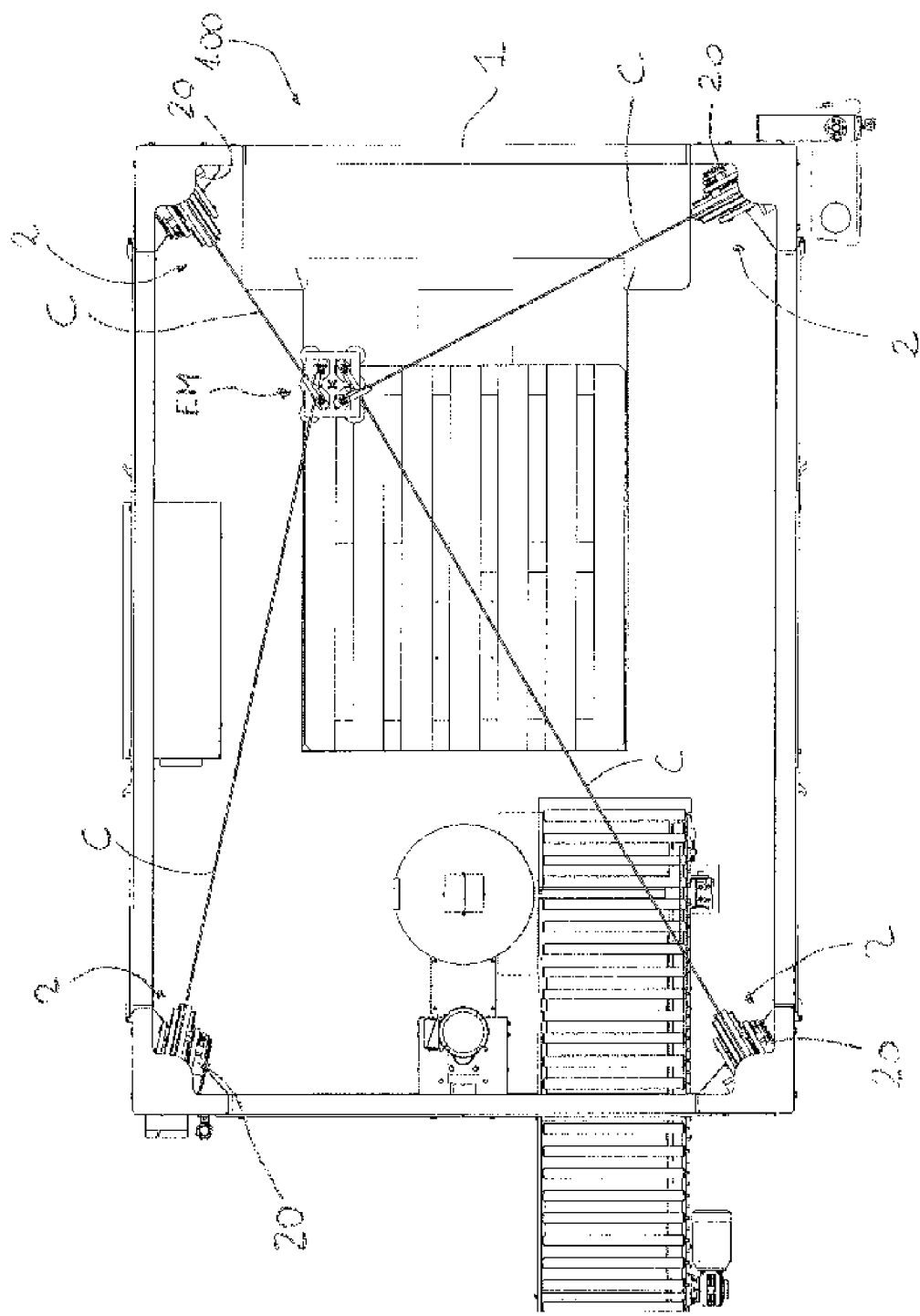

CABLE-DRIVEN ROBOT

FIELD OF THE INVENTION

The present invention relates to the technical sector concerning parallel robots, in particular cable-driven robots.

DESCRIPTION OF THE PRIOR ART

Cable-driven robots are parallel robots in which the movement arms are constituted by cables rather than by rigid or hinged connections.

Cable-driven robots comprise a base structure, or a frame, which is fixed, a movable operating element which must be moved with respect to the base structure in a three-dimensional space by means of a series of cables.

The movable operating element can, for example, comprise a platform on which an operating organ is mounted and predisposed for carrying out determined work operations, such as, for example, picking up and releasing of objects, or other types of operations or processes.

Cable-driven robots comprise a plurality of cables which are connected to the movable operating element and a movement system for moving the cables, and therefore for the movement in space of the movable operating element.

In known cable-driven robots the movement system of the cables comprises a plurality of movement units that are mounted on the base structure.

Each movement unit usually comprises a motor, rigidly fixed to the base structure, and a drum, connected to the motor and activatable in rotation by the motor, on/from which a relative cable is wound/unwound.

Each cable therefore comprises a first end that is fixed to the movable operating element and a second end fixed to a drum of a movement unit.

The motor of each movement unit is predisposed to activate the drum in rotation in two opposite rotation directions, and this determines the winding or unwinding of the cable on/from the drum, and thus the shortening or lengthening of the cable.

In this way, each cable connected to the movable operating element can be shortened (pulled) or lengthened (released) and thus the length thereof (extension) between the fixing point to the movable element and the relative drum can be varied, either by increasing or reducing.

Therefore, by appropriately activating the various motors, i.e. by activating in rotation the relative drums, and thus lengthening or shortening the various cables, it is possible to move and displace the movable operating element with respect to the base structure, and vary the position thereof in a three-dimensional work space.

This type of cable-driven robot is for example described in document FR2910833, of which some figures are contained in FIGS. 1A, 1B, and 1C.

The robot comprises a fixed base structure (F), a movable element (E), a series of cables (C) connected to the movable element (E), and a movement system (S) for moving the cables.

The movement system of the cables (S) comprises a plurality of movement units (G) (for example six as illustrated in FIG. 1A) of the cables (C).

Each movement unit (G) comprises (see the detail of FIGS. 1B and 1C) a motor (M), which is rigidly fixed to a point of the fixed base structure (F), and a drum (T), connected to the motor (M) and activatable in rotation by the motor (M).

Each cable (C) is connected, at a first end, to the movable element (E), and, at a second end, to a drum (T).

Each cable (C), following the driving in rotation of the relative drum (T), in a first rotation direction or in a second rotation direction opposite the first, can be lengthened or shortened, following the unwinding or winding thereof onto/from the drum.

Each cable (C), as for example clearly visible in FIGS. 1B and 1C, comprises a winding portion (CP) on the drum (T) formed by a series of turns, helically wound on the drum (T), of a same diameter and mutually contiguous: the winding portion (CP) therefore forms a helical winding about the drum, with the winding turns contiguous to one another and in reciprocal contact.

The movement system (S) further comprises, for each movement unit (G), cable guide elements (R) or return elements (R) of the cable (C), such as for example eyelets or pulleys, which are predisposed to guide, switch and orientate the cable (C) with respect to the drum (T) on the basis of the actual position that the movable element (E) assumes in space.

This type of cable-driven robot, however, presents some drawbacks.

Firstly, as the cables wind with a helical winding on the drum, with a winding portion which comprises a series of turns contiguous to one another and reciprocally in contact, during the unwinding/winding of the cables there can occur reciprocal dragging between the turns, with a consequent increase in wear thereon.

Further, the cables are subjected to non-insignificant torque stresses when they are switched, by means of the guide or return elements, during the movement of the movable element in space with respect to the drums, as the drums are fixed, since they are fixed to the motors rigidly fixed to the base structure.

SUMMARY OF THE INVENTION

The aim of the present invention is therefore to provide a cable-driven robot able to obviate the above-mentioned drawbacks of the prior art.

In particular, the aim of the present invention is therefore to provide a cable-driven robot able to conserve the integrity of the cables, or at least drastically reduce the onset of wear and, at the same time, guarantee excellent movement of the movable element in a three-dimensional space.

The above aims are attained according to a cable-driven robot according to the claims.

BRIEF DESCRIPTION OF THE DRAWINGS

The characteristics of preferred, but not exclusive, embodiments of the cable-driven robot of the present invention will be described in the following with reference to the appended tables of drawings, in which:

FIG. 1A, already mentioned in the preamble, illustrates a cable-driven robot of the prior art described in document FR2910833, while FIGS. 1B and 1C, also cited in the preamble, illustrate special components of the cable-driven robot of FIG. 1A;

FIG. 2B is a plan view from above of the cable-driven robot of FIG. 2A;

DESCRIPTION OF THE PREFERRED EMBODIMENTS

Figure 2A:
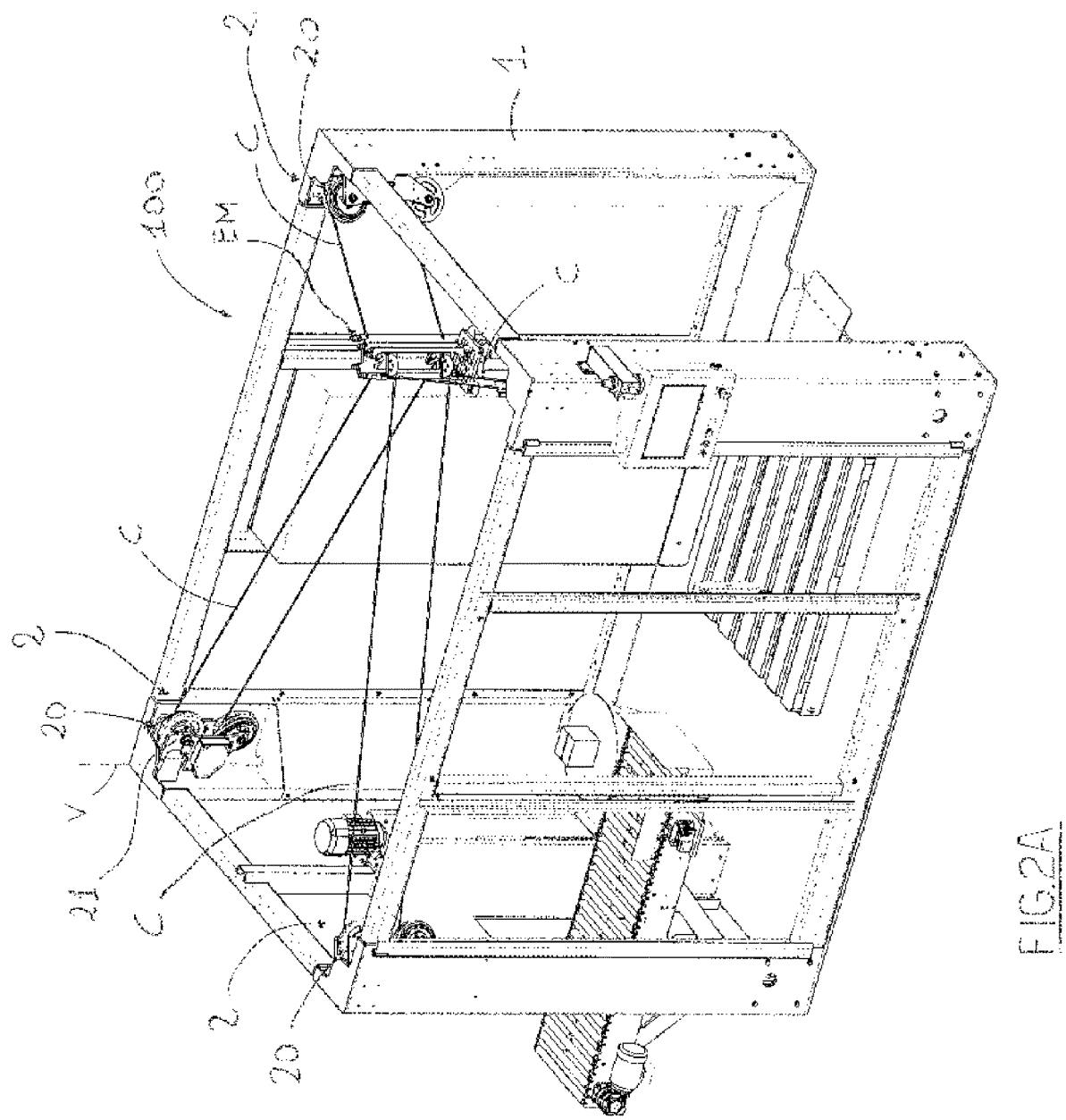
FIG. 2A is a schematic perspective view of a first embodiment of the cable-driven robot of the present invention.
Figure 3A:
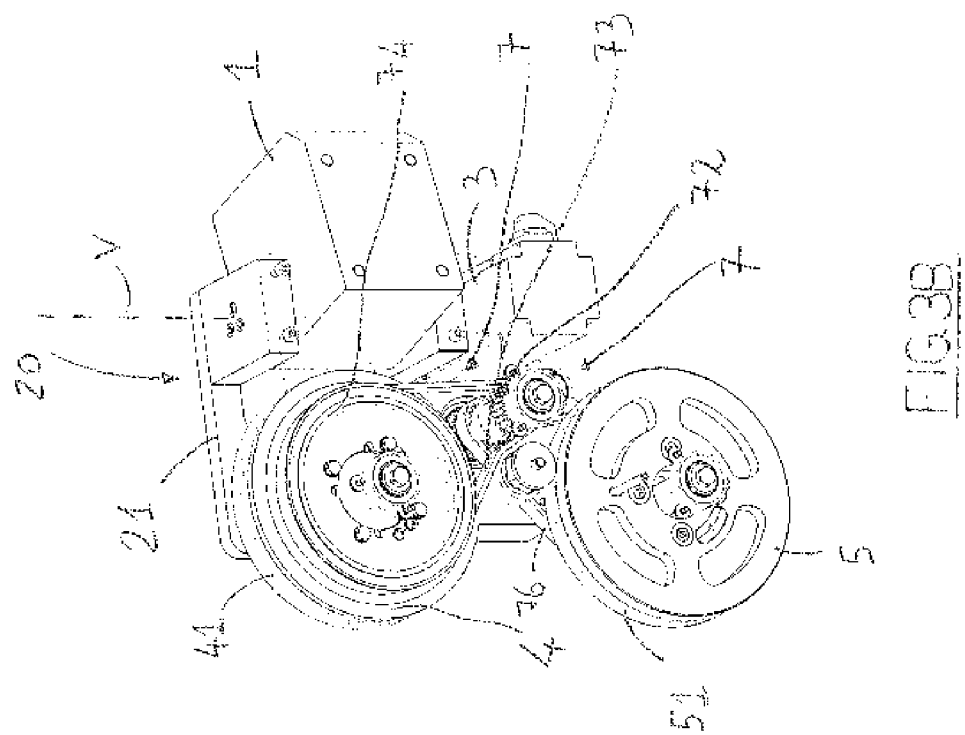
FIG. 3A is a schematic perspective view of some significant components of the cable-driven robot of the present invention.
Figure 3B:
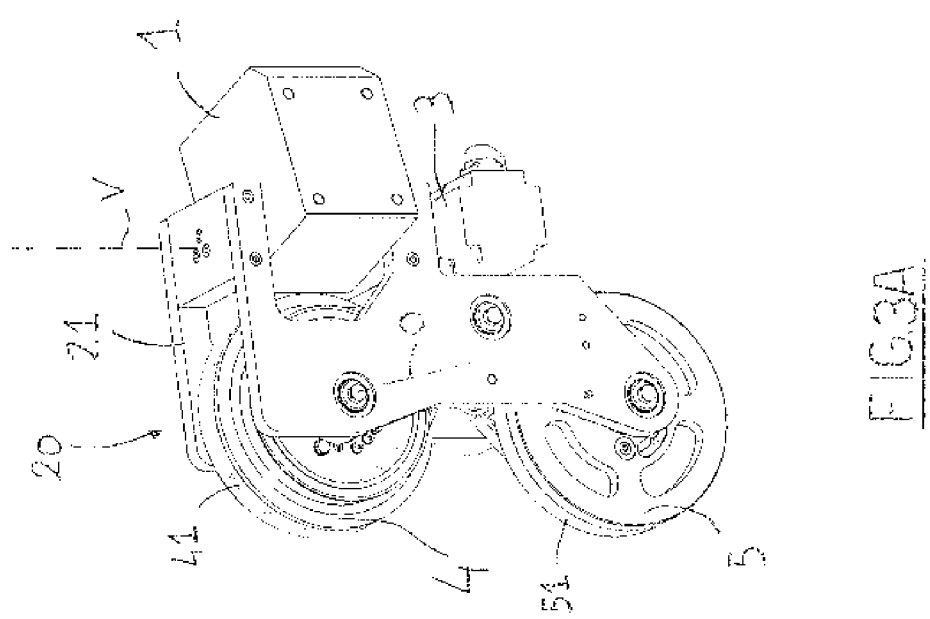
FIG. 3B illustrates, again in a schematic perspective view, the components of FIG. 3A, with some parts removed to better evidence others.
Figure 4A:
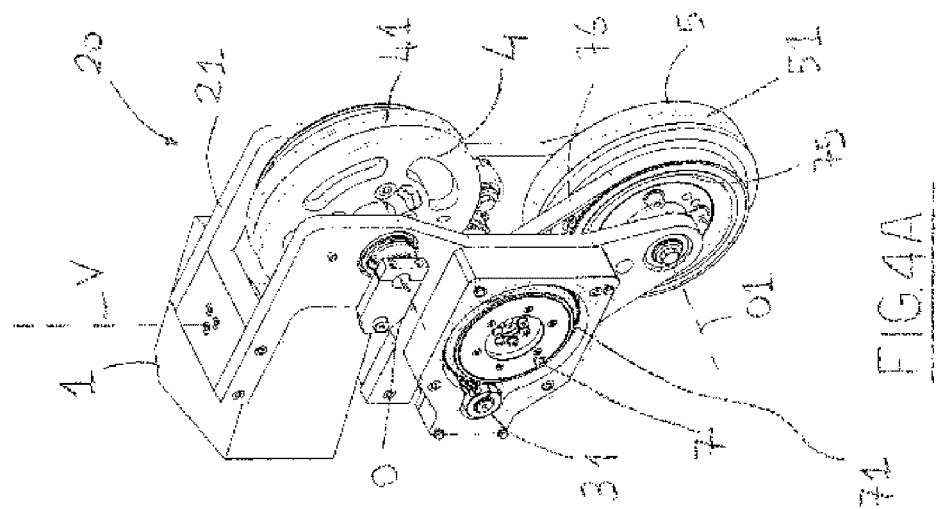
FIG. 4A illustrates the components of FIG. 3A according to a perspective view taken from a different angle.
Figure 4B:
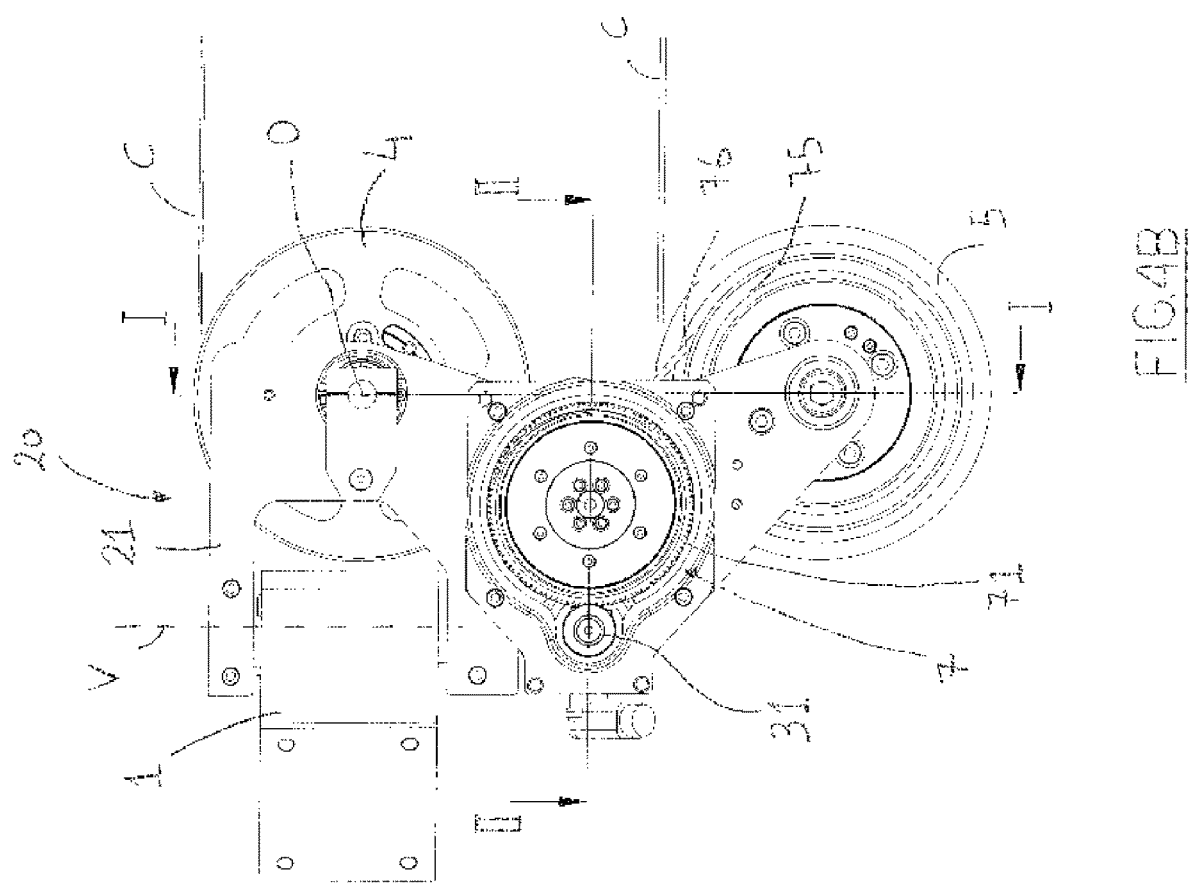
FIG. 4B is a front view of the components of FIG. 4A.

With reference to the accompanying tables of drawings, reference numeral (100) denotes the cable-driven robot of the present invention in its entirety.

The cable-driven robot (100) comprises, in known ways, a base structure (1), a movable operating element (EM), a plurality of cables (C), with each cable (C) of the plurality of cables (C) comprising a first end fixed to the movable operating element (EM).

The cable-driven robot (100) further comprises a movement system (2) for moving the cables (C), and thus for moving the movable operating element (EM) in space with respect to the base structure (1), comprising a plurality of movement units (20) of the cables (C).

The peculiarities of the cable-driven robot (100) of the present invention consist in the fact that it comprises at least a movement unit (20) of the plurality of movement units (20), and, preferably, each movement unit (20) is made and configured in such a way as to comprise:

a frame (21), which is hinged to the base structure (1) pivotingly about a vertical hinge axis (V) in such a way that the frame (21) can rotate about the vertical hinge axis (V) with respect to the base structure (1);

a motor (3), mounted on the frame (21), and comprising a rotation shaft (31);

at least a pulley (4), mounted rotatably on the frame (21) in such a way as to be connected to the rotation shaft (31) of the motor (3) and to be activatable in rotation following the driving in rotation, in one direction or the other, of the rotation shaft (31) by the motor (3).

Figures 5, 6:
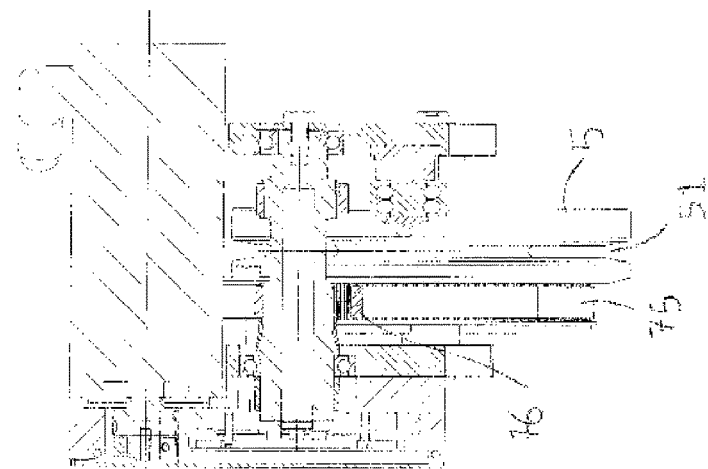
FIG. 5 is the view along section plane I-I of FIG. 4B.
FIG. 6 is a view along section plane II-II of FIG. 4B.

The pulley (4) has a fixing point in which a second end of a cable (C) of the plurality of cables (C) is fixed, and is made in such a way as to comprise a groove (41) which is conformed and dimensioned in such a way as to accommodate and receive, internally thereof, only a winding portion (CA) of the cable (C) comprising a series of winding turns (SA) that are concentric and overlapping one another (see the detail of FIG. 5).

The pulley (4) can be activated in rotation by means of the rotation shaft (31) of the motor (3) in two opposite rotation directions, and this determines the winding or unwinding of the cable in the groove (41) of the pulley (4), and thus the shortening or lengthening thereof.

In this way, the cable connected to the movable operating element can be shortened (pulled) or lengthened (released) and thus the length thereof (extension) between the fixing point to the movable element and the pulley can be varied, either by increasing or reducing.

Thus, in the cable-driven robot of the present invention, in at least a movement unit of the cables, and preferably in all the movement units of the cables, both the motor and the pulley, in the groove of which a cable winds/unwinds, are borne by a frame that is hinged to the base structure pivotingly according to a vertical hinge axis.

In this way, during the movement of the movable operating element in space, as a consequence of the lengthening/shortening of the various cables, the frame of the movement units can rotate about the vertical hinge axis with respect to the base structure.

This enables the pulley in the relative groove of which a winding portion of the cable is wound can also rotate about the hinge axis of the frame of the base structure following the movement of the movable operating element.

Owing to this particularity, in the cable-driven robot of the present invention the used of guide or return elements of the cable are no longer required, while in the prior art they are, in order to switch the cable in outlet from the drum in order to enable following the movement and displacements of the movable operating element in space with respect to the base structure.

Thus, in the cable-driven robot of the present invention, the cables are not subjected to torque stresses.

Further, owing to the special conformation of the groove of the pulley, the cable winds in the groove with a winding portion comprising a series of winding turns which are concentric with one another and overlapping one another, like a sort of Archimedes spiral.

In this way, during the winding/unwinding of the cable in the groove of the pulley, there is no onset of reciprocal dragging among the various turns, as instead happens with cable-driven robots of the prior art in which the cable winds helically on a drum.

Definitively, owing to the above-described particularities, the cable-driven robot of the invention enables the movement of the movable operating element in space with respect to the base structure protecting the cables from undesired torque stresses and considerably limiting any wear thereon.

Other further advantageous characteristics of the apparatus of the cable-driven robot of the invention are described in the following.

The pulley (4) of the at least a movement unit (20), or each pulley of each movement unit, is preferably mounted on the frame (21), and the groove (41) of the pulley (4) is arranged and conformed so that the series of winding turns (SA) that are concentric and overlapping one another of the winding portion (CA) of the cable (C) in the groove (41) lie on a vertical plane aligned with and containing the vertical hinge axis (V) of the frame (21) to the base structure (1).

In more detail, the second pulley (4) is mounted on the frame (21) in such a way as to be rotatable according to a horizontal rotation axis (O) which lies on a vertical plane parallel to the vertical hinge axis (V) of the frame (1).

The groove (41) of the second pulley (4) is preferably arranged and conformed so that the series of winding turns (SA) that are concentric and overlapping one another of the winding portion (CA) of the second cable (C) in the groove (41) lie on a plane that is vertical and perpendicular to the rotation axis (O) of the second pulley (4).

According to the preferred embodiment illustrated in the accompanying figures, the pulley (4) can be activated in rotation by means of the rotation shaft (31) of the motor (3) in the following way.

The pulley (4) can be connected to the rotation shaft (31) of the motor (3) by means of a drive transmission system (7) comprising a cogwheel (71), coupled to the rotation shaft (31) of the motor (3), a cogged hub (72), borne by the cogwheel (71) and a cogged belt (73) which winds on the cogged hub (72) and on a crown wheel (74) mounted on the pulley (4).

Naturally other equivalent drive transmission modes from the rotation shaft of the motor to the pulley can be included, all falling within the scope of the present invention.

In a particularly preferred and advantageous aspect, with the aim of increasing the possibility of moving the movable operating element, or also commanding and activating an operating organ or work organ mounted on the movable operating element, the cable-driven robot of the invention can be predisposed in such a way that the at least a movement unit (20), or also each movement unit, further comprises a second pulley (5), rotatably mounted on the frame (21) according to a second horizontal rotation axis (O1) in such a way as to be connected to the rotation shaft (31) of the motor (3) and to be activatable in rotation following the driving in rotation, in one direction or the other, of the rotation shaft (31) by the motor (3).

The second pulley (5) has a fixing point in which a second end of a second cable (C) of the plurality of cables (C) is fixed, the second pulley (5) comprising a relative groove (51) which is conformed and dimensioned in such a way as to accommodate and receive, internally thereof, only a winding portion (CA) of the second cable (C) comprising a series of winding turns (SA) that are concentric and overlapping one another (see FIG. 5 once more).

The second cable (C) can be connected to the movable operating element or to an operating organ or work organ mounted on the movable operating element.

Therefore, even with the second cable which winds/unwinds in the groove of the second pulley, also mounted on the frame and pivoting with respect to the base structure about the vertical hinge axis, it will not be necessary to have recourse to the use of guide and return elements and therefore it will not be subjected to undesired torque stresses.

Further, owing to the special conformation of the groove of the second pulley, which only allows a winding/unwinding of the second cable in a series of concentric and overlapping turns, it is possible to avoid or at least significantly limit wear.

The ways in which the second pulley (5) is mounted on the frame (21) can be the same as used for the pulley (4).

The second pulley (5) is mounted on the frame (21) and the groove (51) of the second pulley (5) is arranged and conformed so that the series of winding turns (SA) that are concentric and overlapping one another of the winding portion (CA) of the second cable (C) in the groove (51) lie on a vertical plane aligned and containing the vertical hinge axis (V) of the frame (21) to the base structure (1).

In particular, the second pulley (5) is mounted on the frame (21) in such a way as to be rotatable according to a second horizontal rotation axis (O1) which lies on a vertical plane parallel to the vertical hinge axis (V) of the frame (21).

The groove (51) of the second pulley (5) is arranged and conformed so that the series of winding turns (SA) that are concentric and overlapping one another of the winding portion (CA) of the second cable (C) in the groove (51) lie on a plane that is vertical and perpendicular to the rotation axis (O1) of the second pulley (5).

In the preferred embodiment illustrated in the figures of the drawings, the second pulley (5) is connected to the rotation shaft (31) of the motor (3) in the following ways (coupling ways that are different can also be included, but which in any case fall within the scope of the invention).

There are a second crown wheel (75) which is mounted on the second pulley (5), and a second cogged belt (76) which winds on the second crown wheel (75) and on the cogged hub (72) borne by the cogwheel (71) of the drive transmission system (7).

In this way, the driving in rotation of the rotation shaft (31) by the motor (3) contemporaneously determines the driving in rotation of the two pulleys mounted on the frame.

The invention claimed is:

1. A cable-driven robot comprising:
a base structure;
a movable operating element;
a plurality of cables, wherein each cable of the plurality of cables comprises a first end fixed to the movable operating element;
a movement system for moving the cables, and thus for moving the movable operating element in space with respect to the base structure, comprising a plurality of movement units of the cables,
wherein least one movement unit of the plurality of movement units comprises:
a frame, which is hinged to the base structure pivotingly about a vertical hinge axis in such a way that the frame can rotate about the vertical hinge axis with respect to the base structure;
a motor, mounted on the frame, and comprising a rotation shaft;
at least one pulley, mounted rotatably on the frame in such a way as to be connected to the rotation shaft of the motor and to be activatable in rotation following the driving in rotation, in one direction or the other, of the rotation shaft by the motor, the pulley having a fixing point in which a second end of a cable of the plurality of cables is fixed, the pulley comprising a groove which is conformed and dimensioned in such a way as to accommodate and receive, internally thereof, only a winding portion of the cable comprising a series of winding turns that are concentric and overlapping one another;
wherein the pulley is connected to the rotation shaft of the motor by means of a drive transmission system comprising a cogwheel, coupled to the rotation shaft of the motor, a cogged hub, borne by the cogwheel and a cogged belt which winds on the cogged hub and on a crown wheel mounted on the pulley.

2. The cable-driven robot of claim 1, wherein the pulley of the at least one movement unit is mounted on the frame in such a way as to be rotatable according to a horizontal rotation axis, and wherein the at least one movement unit comprises a second pulley, rotatably mounted on the frame according to a second horizontal rotation axis so as to be connected to the rotation shaft of the motor and to be activatable in rotation following the driving in rotation, in one direction or the other, of the rotation shaft by the motor, the second pulley having a fixing point in which a second end of a second cable of the plurality of cables is fixed, the second pulley comprising a respective groove which is conformed and dimensioned in such a way as to accommodate and receive, internally thereof, only a winding portion of the second cable comprising a series of winding turns that are concentric and overlapping one another,
further comprising a second crown wheel mounted on the second pulley and a second cogged belt which winds on the second crown wheel and on the cogged hub of the drive transmission system.

3. The cable-driven robot of claim 1, wherein the pulley of the at least one movement unit is mounted on the frame and wherein the groove of the pulley is arranged and conformed so that the series of winding turns that are concentric and overlapping one another of the winding portion of the cable in the groove lie on a vertical plane aligned and containing the vertical hinge axis of the frame to the base structure.

4. The cable-driven robot of claim 1, wherein the pulley is connected to the rotation shaft of the motor by means of a drive transmission system comprising a cogwheel, coupled to the rotation shaft of the motor, a cogged hub, borne by the cogwheel and a cogged belt which winds on the cogged hub and on a crown wheel mounted on the pulley.

5. The cable-driven robot of claim 1, wherein the pulley of the at least one movement unit is mounted on the frame and wherein the groove of the pulley is arranged and conformed so that the series of winding turns that are concentric and overlapping one another of the winding portion of the cable in the groove lie on a vertical plane aligned and containing the vertical hinge axis of the frame to the base structure.

6. The cable-driven robot of claim 1, wherein the pulley is connected to the rotation shaft of the motor by means of a drive transmission system comprising a cogwheel, coupled to the rotation shaft of the motor, a cogged hub, borne by the cogwheel and a cogged belt which winds on the cogged hub and on a crown wheel mounted on the pulley.

7. A cable-driven robot comprising:
a base structure;
a movable operating element;
a plurality of cables, wherein each cable of the plurality of cables comprises a first end fixed to the movable operating element;
a movement system for moving the cables, and thus for moving the movable operating element in space with respect to the base structure, comprising a plurality of movement units of the cables,
wherein least one movement unit of the plurality of movement units comprises:
a frame, which is hinged to the base structure pivotingly about a vertical hinge axis in such a way that the frame can rotate about the vertical hinge axis with respect to the base structure;
a motor, mounted on the frame, and comprising a rotation shaft;
at least one pulley, mounted rotatably on the frame in such a way as to be connected to the rotation shaft of the motor and to be activatable in rotation following the driving in rotation, in one direction or the other, of the rotation shaft by the motor, the pulley having a fixing point in which a second end of a cable of the plurality of cables is fixed, the pulley comprising a groove which is conformed and dimensioned in such a way as to accommodate and receive, internally thereof, only a winding portion of the cable comprising a series of winding turns that are concentric and overlapping one another, wherein the pulley of the at least one movement unit is mounted on the frame in such a way as to be rotatable according to a horizontal rotation axis, and wherein the at least one movement unit comprises a second pulley, rotatably mounted on the frame according to a second horizontal rotation axis so as to be connected to the rotation shaft of the motor and to be activatable in rotation following the driving in rotation, in one direction or the other, of the rotation shaft by the motor, the second pulley having a fixing point in which a second end of a second cable of the plurality of cables is fixed, the second pulley comprising a respective groove which is conformed and dimensioned in such a way as to accommodate and receive, internally thereof, only a winding portion of the second cable comprising a series of winding turns that are concentric and overlapping one another.

8. The cable-driven robot of claim 7, wherein the second pulley is mounted on the frame and the groove of the second pulley is arranged and conformed so that the series of winding turns that are concentric and overlapping one another of the winding portion of the second cable in the groove lie on a vertical plane aligned and containing the vertical hinge axis of the frame to the base structure.

9. The cable-driven robot of claim 8, wherein the second pulley is mounted on the frame in such a way as to be rotatable according to the second horizontal rotation axis which lies on a vertical plane parallel to the vertical hinge axis of the frame.

10. The cable-driven robot of claim 8, wherein the groove of the second pulley is arranged and conformed so that the series of winding turns that are concentric and overlapping one another of the winding portion of the second cable in the groove lie on a plane that is vertical and perpendicular to the rotation axis of the second pulley.

* * * * *